April 25, 1939.  E. AUGUSTIN ET AL  2,156,170
APPARATUS FOR MAKING RADIOGRAPHS OF BODY SECTIONS OR BODY LAYERS
Filed Oct. 25, 1935   12 Sheets-Sheet 1

Inventors.
EMIL AGUSTIN
KURT FÜGMANN
WILLY KLEIN
HEINRICH SCHLIEMANN
HEINRICH HERRMANN By Edward H Palmer
Attorney.

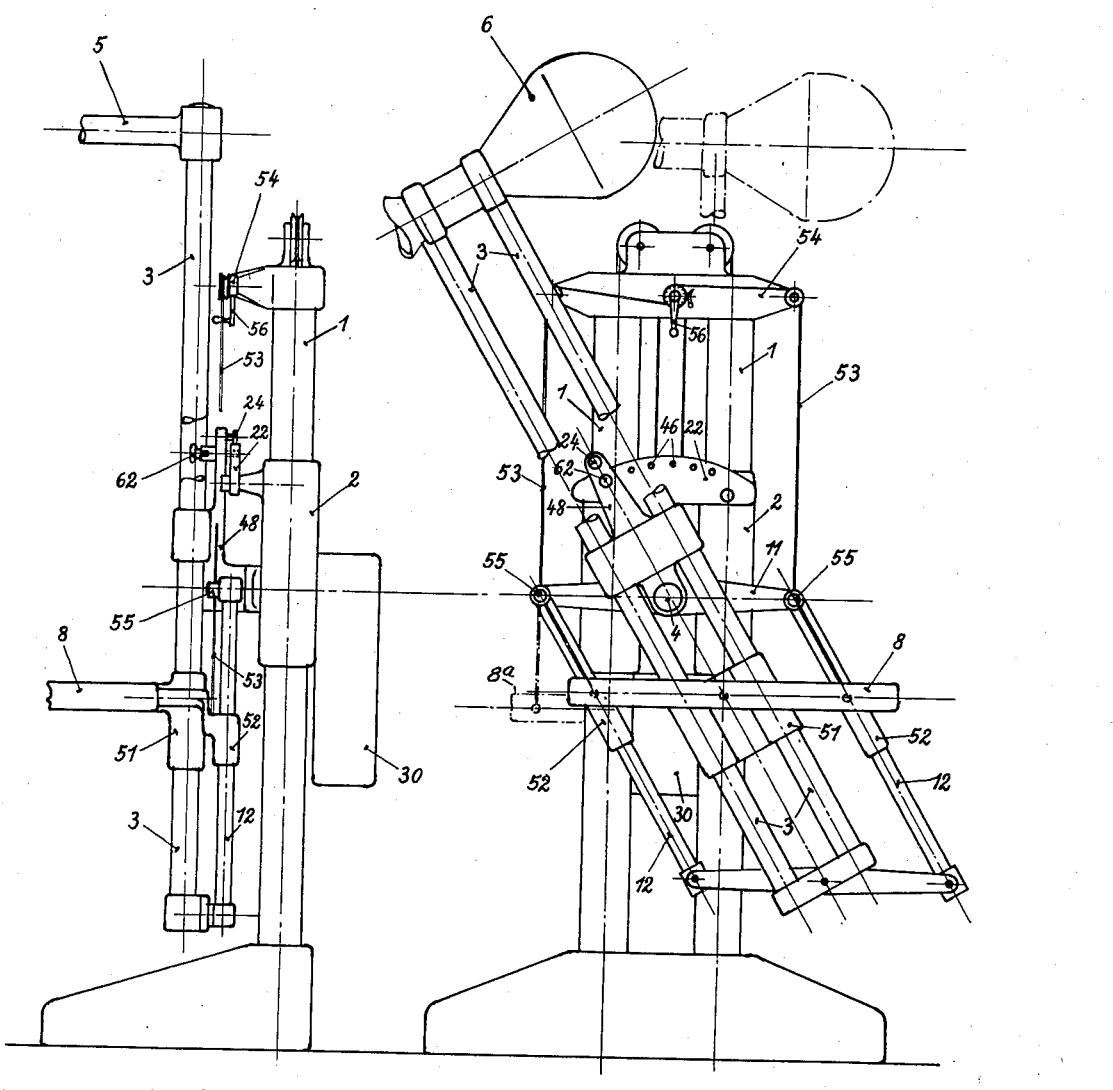

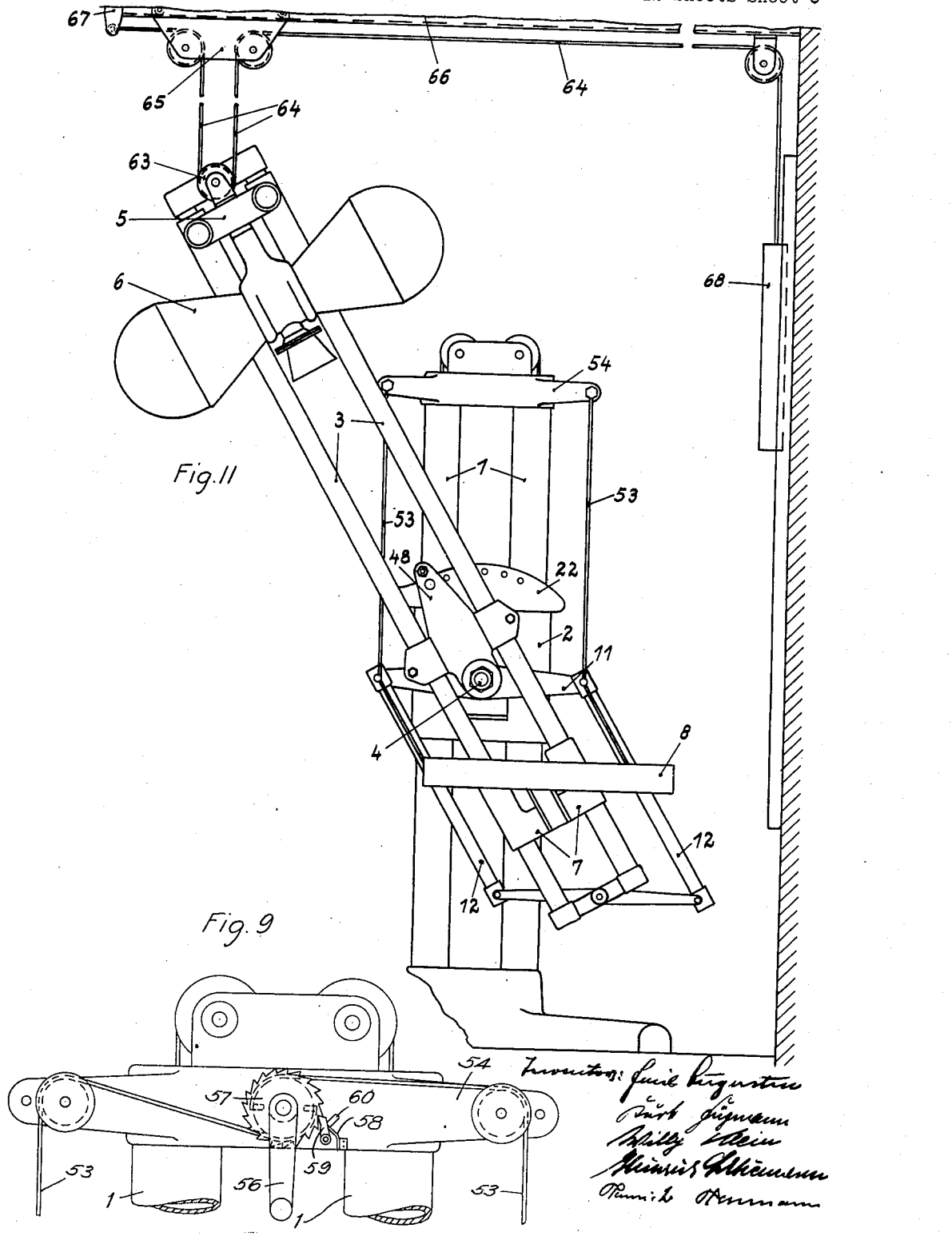

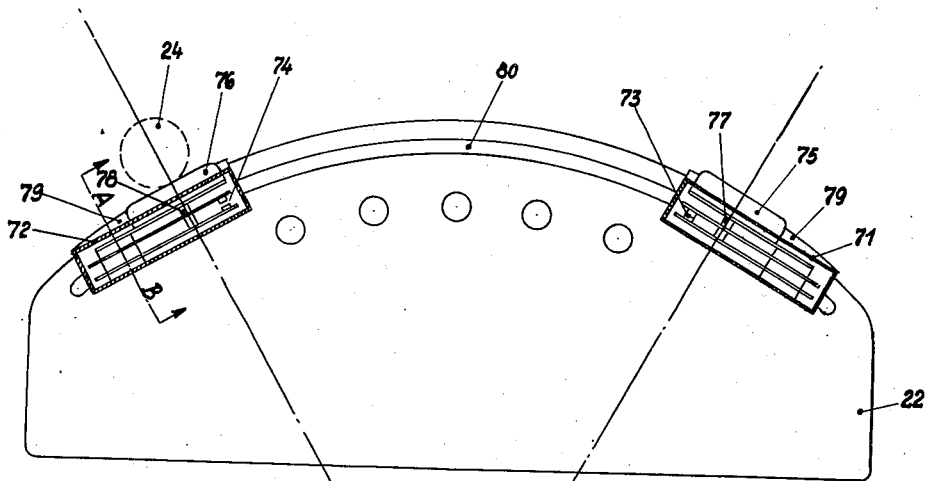
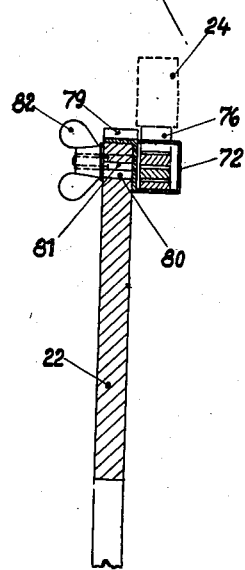
Fig. 14
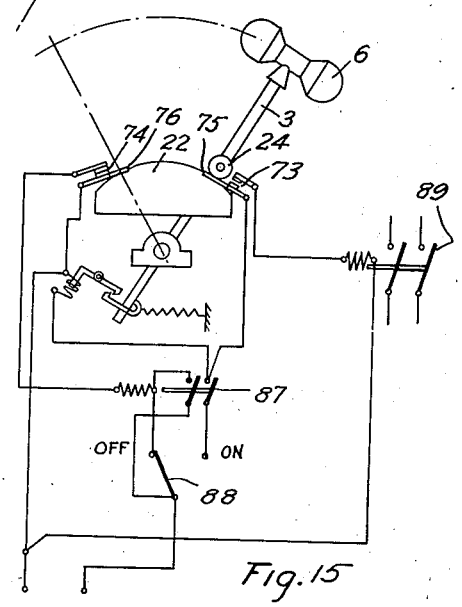
Fig. 15

Patented Apr. 25, 1939

2,156,170

UNITED STATES PATENT OFFICE 2,156,170

APPARATUS FOR MAKING RADIOGRAPHS OF BODY SECTIONS OR BODY LAYERS

Emil Augustin, Kurt Fügmann, Willy Klein, Heinrich Schliemann, and Heinrich Herrmann, Berlin, Germany, assignors to Electricitätsgesellschaft "Sanitas", Berlin, Germany, a corporation of Germany Application October 25, 1935, Serial No. 46,650
In Germany November 3, 1934

20 Claims. (Cl. 250—58)

This invention relates to radiography and radioscopy and has for its object more particularly to provide improved apparatus for making radiographs of body sections and/or body layers.

The invention and its aims and objects will be readily understood from the following description, taken in connection with the accompanying drawings of embodiments of the invention herein given for illustrative purposes, the true scope of the invention being more particularly pointed out in the appended claims.

In the drawings:

Fig. 7 shows a modified structure in side elevation;

Fig. 8 is a front elevation of the structure shown in Fig. 7;

Fig. 9 is a detail of Fig. 8 showing the rope fastening on a larger scale;

Fig. 11 is a view similar to Fig. 10 but with said lever 3 at its extreme position to one side;

Fig. 13 shows diagrammatically illustrative means for adjustably limiting the time the X-ray shall be switched on during the swinging movement of said lever 3;

Fig. 14 is a cross section on line A—B of Fig. 13;

Fig. 15 shows partly diagrammatically similar illustrative means comprising a holding relay for preventing an overload on the X-ray tube;

Figure 1:
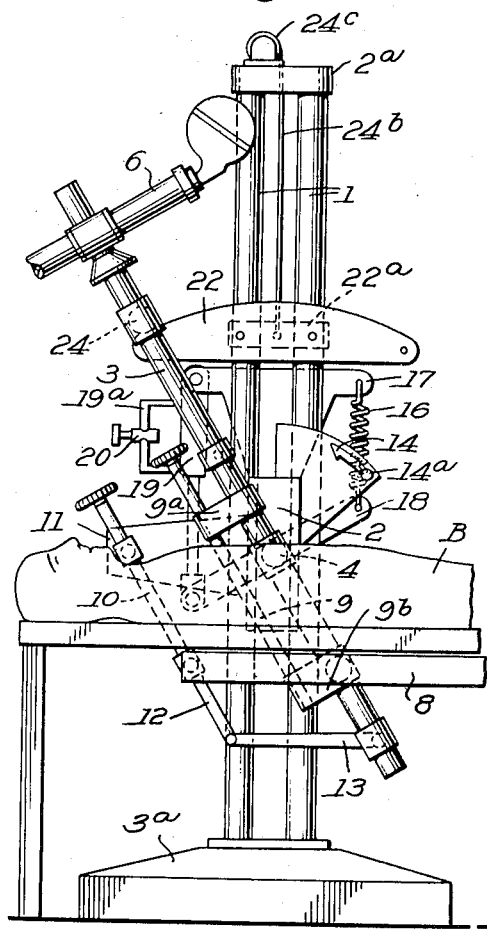
Fig. 1 is a front elevation of one illustrative embodiment of the invention.

In the illustrative embodiments of the invention herein shown, the X-ray tube and the sensitive layer carrier (film or plate holder with or without a diaphragm for stray rays) are positively connected and adapted to rock or be swung about an axis located in the plane of the body section or layer to be reproduced, in such manner that an X-ray passing through any point of the body section or layer to be reproduced always falls upon the same point of the sensitive layer, which latter is always maintained parallel to the plane of the body section or layer during the swinging movement of said X-ray tube and said light sensitive layer by suitable means. In said illustrative embodiments of the invention, said positive connection of the X-ray tube with the plate or film holder preferably consists of a two-armed lever adapted to swing about the axis of a shaft 4 and carrying adjacent one end the X-ray tube and adjacent its other end the plate or film holder preferably also provided with the diaphragm for stray rays.

In practice such an apparatus must fulfill certain requirements which have not been sufficiently recognized heretofore, and more particularly requirements relating to the movement and displacement or adjustment of the swinging system as a whole or of separate parts thereof. Above all things the entire swinging system should move as uniformly as possible during the making of the exposure in order that the shadows may be uniformly obliterated in the radiograph. Furthermore the adjustment or displacement of the parts of the swinging system or of the swinging system itself should be easily effected and with as little displacement or movement as possible of heavy masses in radiographing body sections in different planes or body layers of different thickness. In addition the construction and operation of the apparatus should be simple, of low cost and comprehensive and should possess the required reliability in operation.

The present invention takes into account the fact that all the difficulties encountered in fulfilling the above requirements are attributable to the same cause, namely the prejudicial effect exerted by the considerable weight of the swinging system or individual parts thereof upon the swinging movement thereof during the making of the exposure or upon the rapid ready displacement or adjustment of said system or parts thereof. One of the objects of the invention is to diminish this prejudicial effect or render it ineffective wherever it appears and in whatever manner it makes itself felt. Means are accordingly provided to accomplish this result wherever the operation, manipulation or usefulness of the apparatus are injuriously affected or impeded by the weight of the system or its injurious effects. The provision made for this purpose in accordance with the invention may be of any suitable kind and will preferably include, in addition to means which either directly or indirectly serve to relieve the weight, of means which diminish the number or the extent of the necessary movements of said swinging system or of its individual parts.

In order to secure a uniform swinging movement of said system during the making of the exposure it is necessary that the action of the weight of the masses of said system, where such action is used for operative purposes in the apparatus, be replaced by other sources of power. Heretofore in apparatus of this kind gravity was used as the motive power for the swinging movement of said swinging system from one extreme position thereof to the other. To vary the duration of said swinging movement which is preferably always somewhat longer that that necessary for the exposure additional weights were used by the adjustment of which the center of gravity of said swinging system could be shifted. Apart from the fact that by the use of such means the duration of the swinging movement could be varied only in a small degree, the use of such additional weights disadvantageously increases the weight of the device and in addition induces an irregular swinging movement since the leverage arm of such driving weight varies constantly according to the angular position of said swinging system.

To meet this difficulty suitable means are provided in accordance with the invention, said means herein preferably comprising a resilient or spring drive for effecting said swinging movement. For regulating the duration of said swinging movement any suitable means may be provided in accordance with the invention. Herein said means will preferably comprise a controllable or adjustable braking force, for example an oil pump, which acts in opposition to said resilient drive. By adjusting the valve controlling the oil flow in said pump the braking action of the latter can be readily and suitably varied or adjusted within the limits required for the time of exposure in making radiographs.

Figure 2:
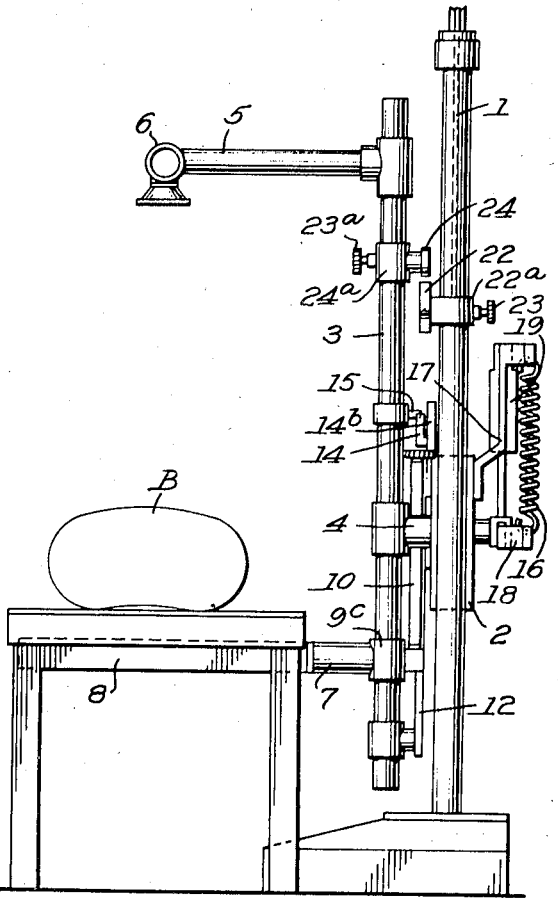
Fig. 2 is a lateral elevation of the embodiment shown in Fig. 1.

In Figs. 1 and 2 an apparatus is shown provided with an illustrative resilient drive in accordance with the present invention. A carriage 2 is adapted to slide vertically along guides provided on the two standards 1 connected at their top by a cross piece 2a and fastened at their bottom in a suitable base 3a. Said carriage slides weightless and may be clamped in any vertical position desired by suitable clamping means (not shown). The swinging supporting means for the X-ray tube and the ray-sensitive layer, herein comprising a two-armed lever 3 is carried by hollow shaft 4 mounted for rocking movement in said carriage 2. The supporting arm 5 for the X-ray tube 6 is adjustably mounted at the upper end of said two-armed lever, and upon the lower arm of said lever a support 7 is provided carrying a frame 8 rotatable about the axis of said support 7, said frame being adapted to receive a film or plate holder with or without a diaphragm or shield for stray rays. In making the exposure only the plane of the body section in which the axis about which said lever swings will be sharply pictured. It is therefore necessary that the height of said axis be correctly adjusted for each exposure. As on the other hand the distance separating the body section to be radiographed and the ray-sensitive layer must be as short as possible having regard to the sharpness of the picture, said film or plate holder must be adjusted after the adjustment of the axis about which said lever swings. In the illustrative embodiment of the invention this adjustment of said film or plate holder is conveniently effected by rotation of a spindle 9. To this end (see Fig. 1) a member 9a is rigidly secured to said lever 3 and has an interiorly threaded portion at its free end in screw threaded engagement with an exteriorly screw threaded portion of said spindle 9. Another member 9b is slidably mounted upon said lever 3 being secured to a sleeve 9c (see Fig. 2) slidable upon said lever 3 and carrying said support 7 for said plate holder carrying frame 8. The lower end of said spindle 9 is rotatably held in the free end of said member 9b. In order that the ray-sensitive layer shall always remain parallel to the body section to be radiographed during the swinging movement of said two-armed lever, the frame 8 is rotatable about the axis of the support 7 and a second spindle 10 is pivotally connected to the end of said frame and to a bracket 11 carried by said carriage 2, the pivotal connection of said spindle 10 with said bracket 11 being at the same level as the axis of said shaft 4. The parallel link system thus formed ensures that said film or plate holder shall always remain parallel to itself during the swinging movement of said two-armed lever. If the distance separating the frame 8 from the shaft 4 is very small the stresses on the pivots of the spindle 10 may be too great. To avoid this a second link system comprising the links 12, 13 is provided which is located at a considerable and invariable distance from said shaft 4 and ensures said parallel movement of said film or plate holder.

The invention contemplates the provision of means for locking the swinging system comprising the two-armed lever 3 in its preparatory position. Herein said means conveniently comprises a pin 15 carried by said arm 3 and engaged by a dog 14 pivoted at 14a upon a member 14b carried by said standards 1. Any suitable means may be provided to withdraw said dog and release the lever 3. Herein said release is preferably effected by means electrically operated from the switchboard shortly before the beginning of the exposure.

The resilient driving or actuating means to effect the swinging movement of said lever system 3 herein conveniently comprises a helical spring 16 having one end connected to a bracket 17 carried by the carriage 2 and its other end to one end of a two-armed lever 18 secured to the shaft 4 at right angles to the two-armed lever 3. In Fig. 1, lever 3 is shown in the position it occupies after completing its swinging movement in the making of the exposure. Spring 16 is therefore relaxed. Before making an exposure said lever is swung to the right (see Fig. 1) till the dog 14 engages the pin 15, thus tensioning said spring. Upon release of said dog from said pin, said spring swings lever 3 to the left (see Fig. 1) to make the exposure. In order to adjust or regulate the time of the swinging movement of said lever 3 to correspond to the exposure, braking means is provided, said means herein comprising conveniently a cylinder 19 containing oil and also mounted upon said bracket 17. A piston working in said cylinder has its rod pivotally connected to the other end of said arm or lever 18 and said cylinder is pivotally connected to said bracket. A pipe 19a communicates with the interior of said cylinder at opposite sides of the piston therein and contains a valve 20 controlled by a screw-threaded spindle having a head for rotating the same. The flow of oil from one side of said piston to the other may thus be controlled to vary the time of the swinging movement of said lever 3 as desired within the limits required for suitably timing the exposures.

The resilient drive for said lever 3 may be so constructed that the spring equalizes or neutralizes the friction throughout the entire path of the swinging movement, in which case a separate force, preferably a second spring which is operative only at the beginning of said swinging movement, communicates the necessary acceleration to said lever. Both said springs will preferably act upon said swinging lever shaft 4 through suitable levers. If possible said swinging system will be equalized in respect to said shaft 4.

In this type of resilient drive it is preferable that the spring for overcoming or neutralizing the friction shall be such and so arranged that its cooperating lever arm shall increase as the force of said spring diminishes in the course of the swinging movement of said lever 3 so that its torsional moment, acting on said shaft 4 shall remain substantially constant during the entire swinging movement of said lever 3. Preferably a leaf spring will be used for the acceleration action. Said leaf spring, when said lever 3 has been released, imparts a sufficient swing to a lever secured to said shaft 4.

Figure 3:
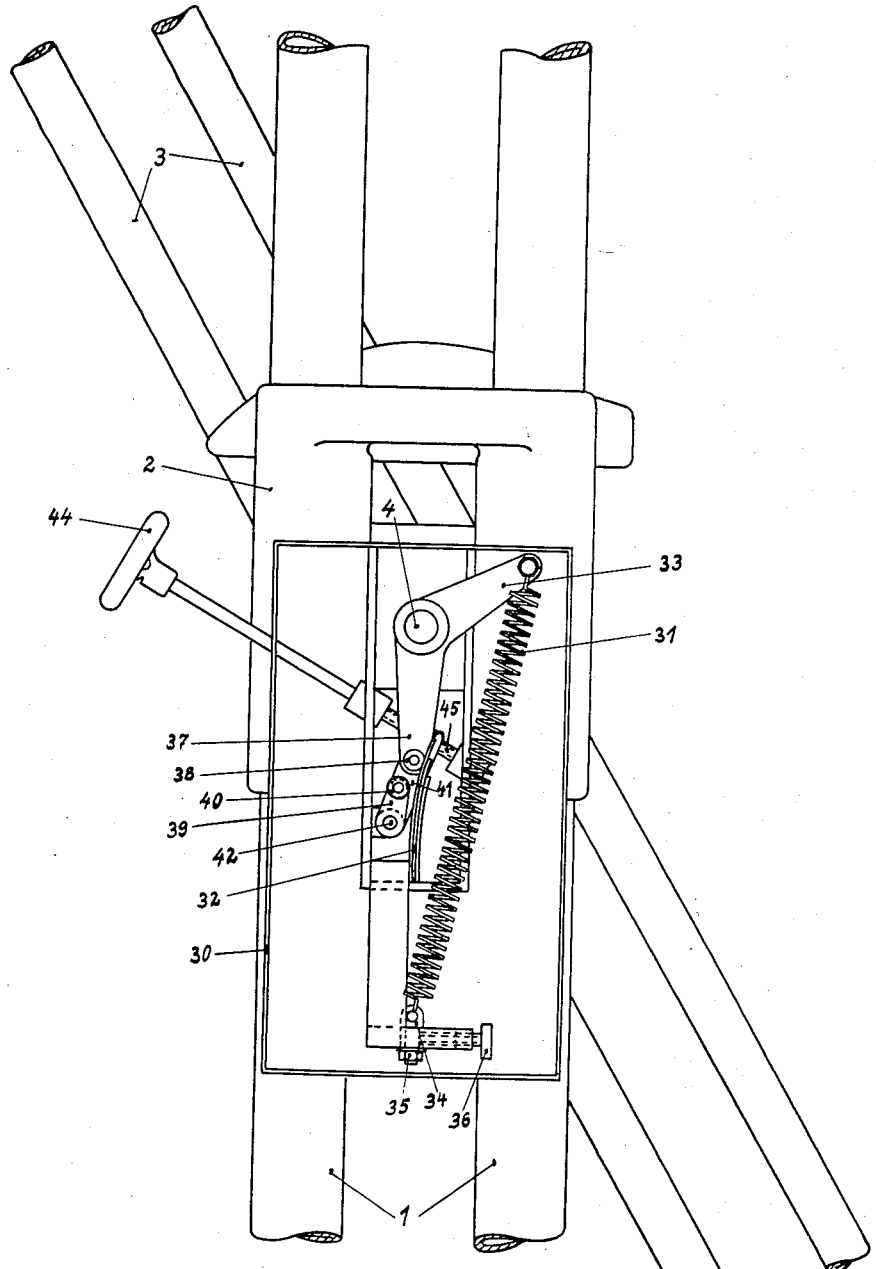
Fig. 3 is a back elevation of an illustrative embodiment of means for effecting the swinging movement of the lever 3 and parts carried thereby, said means being shown in the preparatory position of said swinging movement.
Figure 4:
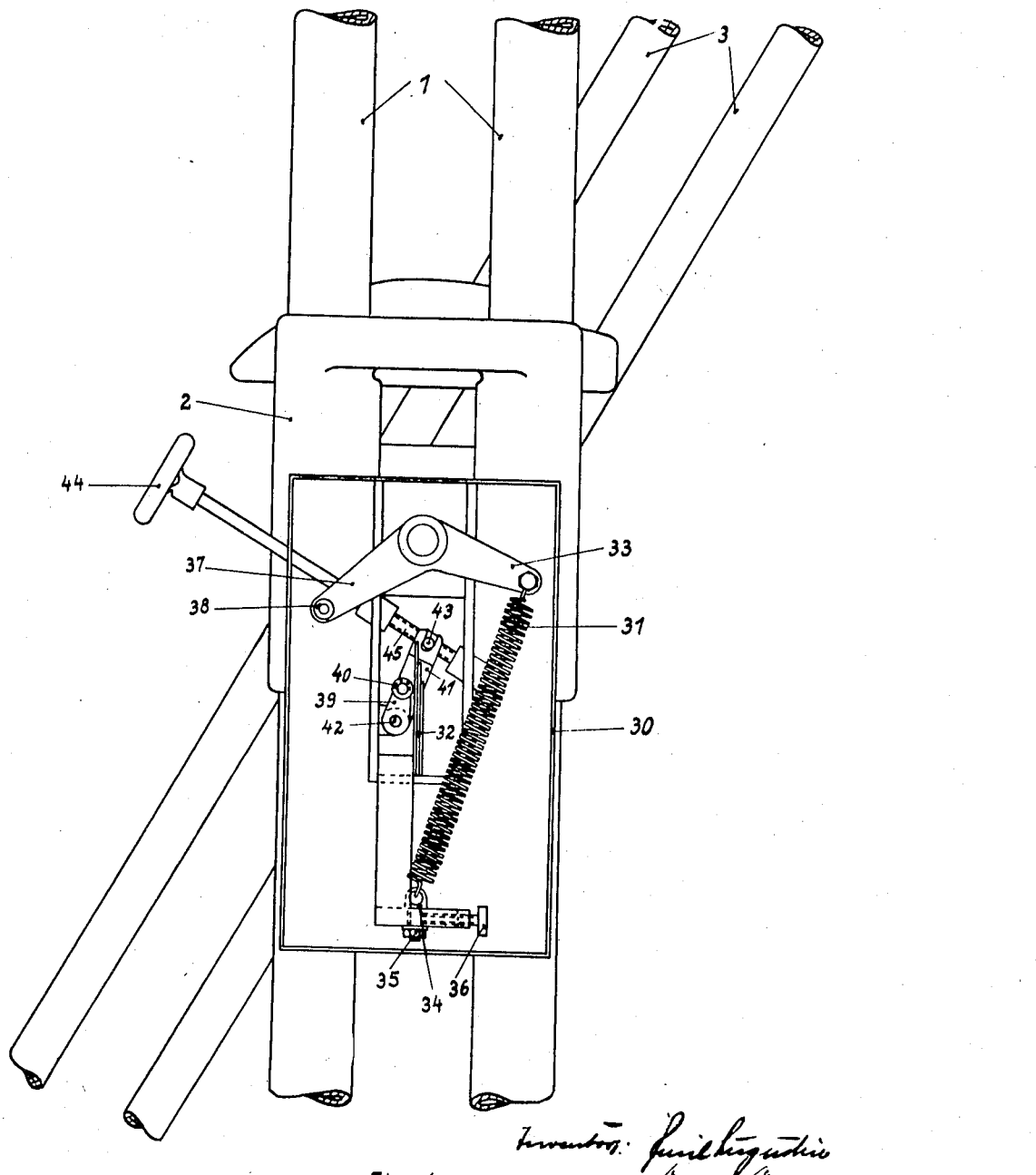
Fig. 4 is a view similar to Fig. 3 with said lever 3 and parts carried thereby at one end of said swinging movement.

An illustrative embodiment of the above-described construction is shown in Figs. 3 and 4, Fig. 3 showing the parts in the preparatory position while Fig. 4 shows the parts at one of the end positions of the swinging movement. The resilient drive is preferably contained in a housing 30 and comprises a helical spring 31 and a leaf spring 32, the former serving to overcome the friction of the swinging system. One end of said helical spring is connected to a lever 33 secured to the shaft 4 and the other end of said spring is secured to a screw-threaded member 34 which can be adjusted vertically by means of the nut 35 to vary the strength of said spring, and horizontally by means of the screw 36 to vary the effective leverage of said spring, that is to say the distance from the shaft 4 to the spring measured by a straight line drawn from said shaft 4 to said spring at right angles to the latter. In any event said helical spring 31 is so chosen and mounted that its effective leverage increases as the force of said spring decreases during the swinging movement of said lever 3 so that the torque of said spring on said shaft 4 remains substantially constant throughout the entire swinging movement of said lever 3.

The acceleration or starting spring 32 is put under tension by the lever arm 37 carried by the shaft 4, when the lever 3 is swung into preparatory or starting position, said lever arm acting through a roll 38. Upon release of said lever 3 the leaf spring 32 imparts a swing impulse to said lever 3 during the short movement of said spring until its tension is exhausted, the swing thus imparted sufficing for the entire distance of said swinging movement, in view of the fact that the friction is eliminated by the spring 31 and the swinging movement thus imparted being sufficiently uniform.

In order to vary the time or duration of the swinging movement from its beginning to the end thereof it is necessary to vary the force of the starting impulse. This may be effected for example by varying, shortening for example the distance throughout which the spring 32 acts upon said lever 37. To this end a lever 39 is provided, fixed to another lever 41 and carrying a roll 40 in the path of said spring. The two levers 39 and 41 are rotatable about a stud 42 and the free end of said lever 41 is slotted to engage a metal pin 43 (see Fig. 4) carried by a fixed sleeve having screw-threaded engagement with a screw-threaded spindle 45 provided with a hand wheel 44. By rotating said spindle the lever 41 will be adjusted about the stud 42 and the distance separating the roll 40 from the spring 32 will thus be varied. The smaller this distance the shorter will be the distance throughout which the spring 32 will act upon the lever 37 and the shaft 4 and consequently the weaker will be the starting impulse force and the longer will be the swinging time of said lever 3. A scale may be mounted on the spindle drive to facilitate the adjustment for any desired swinging time of said lever 3.

The considerable weight of the swinging system presents difficulties not only to obtain a uniform swinging movement but also to a rapid adjustment and displacement of the shaft 4 for different section planes. This is particularly the case where said shaft 4 must be displaced a distance corresponding to the thickness of the body layers to be radiographed during the exposure when it is desired to make radiographs of body layers of a given thickness. Means are accordingly provided in accordance with the invention to overcome these difficulties. In the illustrative embodiment of the invention shown said means comprises a more or less curved member, the curvature of which corresponds to the thickness of the body section to be radiographed and which during the swinging movement of said lever 3 cooperates with a roll 24 which engages the upper edge of said member 22 and is rotatably mounted upon a sleeve 24a slidable upon said lever 3. A set screw 23a serves to clamp said sleeve in adjusted position. Said member 22 is connected to one end of a cord 24b passing over a pulley 24c rotatably mounted upon said cross member 2a and carrying at its other end a counterbalancing weight (not shown) slidable within the left standard 1. Said member 22 is carried by a sleeve 22a slidable on standards 1, 1, and as lever 3 and parts carried thereby are carried by the carriage 2, also slidable along said standards 1, 1 the whole swinging system and member 22 are counterbalanced.

A plurality of such curved members may be provided having different degrees of curvature to provide for different body layer thicknesses, said curved members being interchangeable. The same curved member may, however, be used for any body layer thickness, said curved member which may consists of a member having a surface curved in the arc of a circle or of a worm having a continually varying curvature being adjustable about an axis perpendicular to said member.

Referring to Fig. 2, a clamping screw 23 is provided for clamping said member 22 in any vertical position in which it is adjusted.

If the carriage 2 be not clamped upon the standard 1, then the entire structure will be supported by said roll 24. As a consequence the entire system, including the shaft 4 which determines the position of the body section reproduced in the radiograph, will be displaced or moved, when the roll 24 rolls along the upper curved surface of said member 22 in the swinging movement of said lever 3, said displacement being vertical and in correspondence with the curvature of the upper surface of said member. The more the curvature of the upper edge of said member 22 increases toward the end of said member, over that of a circle having as center the axis of the shaft 4, the more said shaft 4 will drop during the exposure and the greater will be the thickness of the body layer reproduced on the film. Any body layer of any desired thickness can therefore be radiographed. If the carriage 2 be clamped upon said standards an ordinary body section radiograph will be produced.

By lessening the curvature of the upper edge of said member 22 adjacent its ends, an additional braking action on said swinging system toward the end of its swinging movement can be secured, as shown in Fig. 1.

Figure 17:
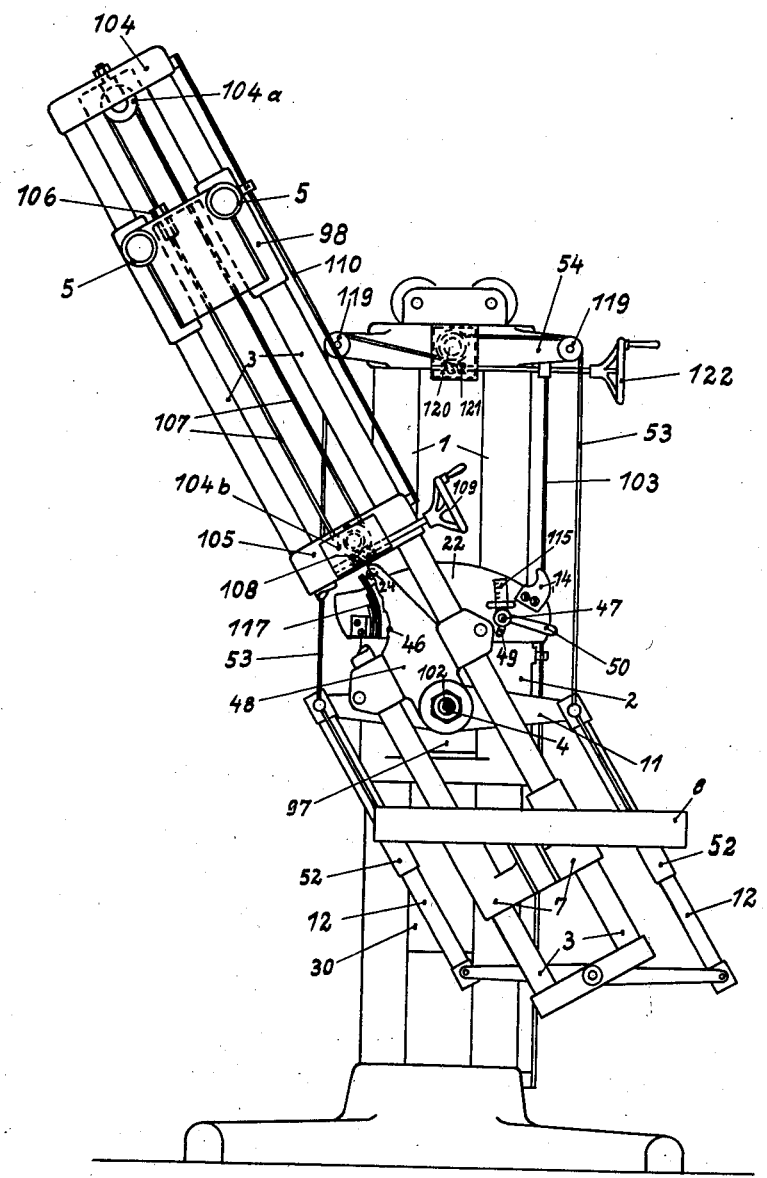
Fig. 17 is a front elevation of apparatus embodying most of the features previously illustrated and others, more particularly means for the rapid adjustment of the apparatus and of the magnitudes which control in making radiographs of body sections or layers.
Figure 18:
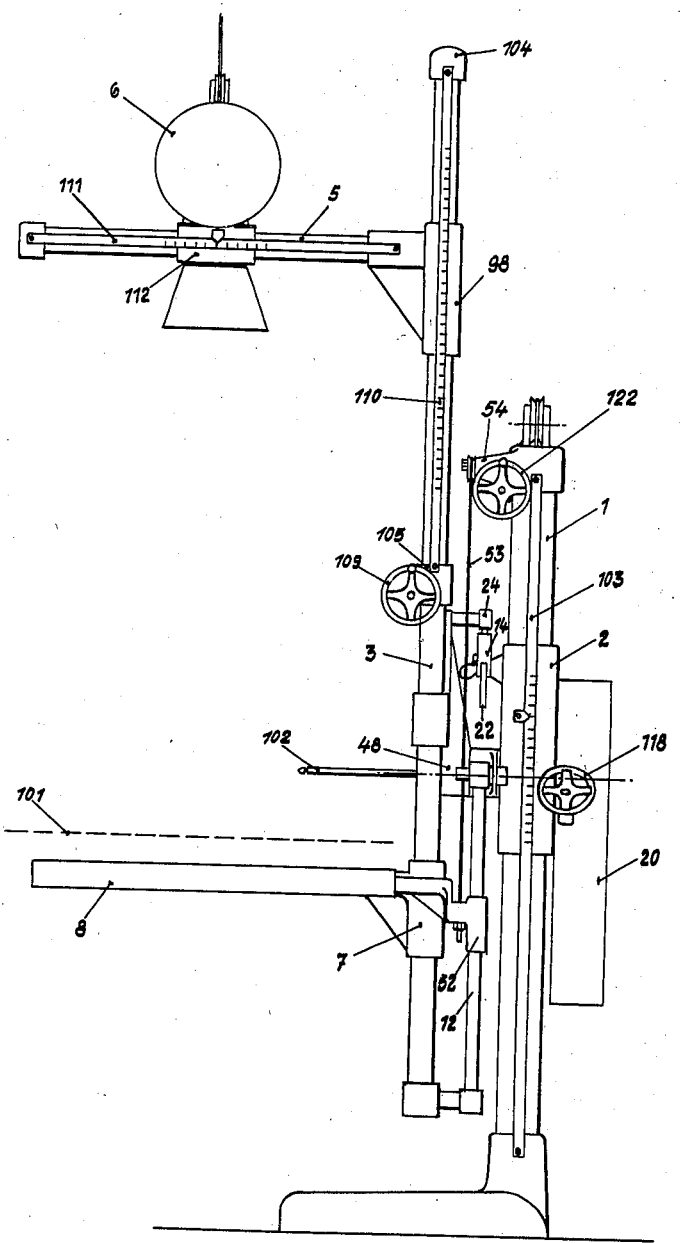
Fig. 18 is a lateral elevation of the apparatus shown in Fig. 17.

A curved member which is adjustable to provide for making radiographs of body layers of different thicknesses is shown in Figs. 17 and 18. Therein said curved member 22 is carried by shafts 46 and 47 mounted on the carriage 2. During the swinging movement of said lever 3 the roll 24 carried by a member 48 secured to lever 3 and to said shaft 4 rolls along the curved upper edge of said curved member 22, said member 48 supporting the whole swinging system with the shaft 4 and its positioning slide which slides upon the carriage 2. The height of said shaft 4 and therefore the position of the body section to be reproduced in the radiograph are therefore dependent upon said roll 24 or said curved member 22. The shaft 47 engages a curved slot 49 in said curved member 22. The right side of said curved member can therefore be raised or lowered about the shaft 46 and may be clamped in adjusted position by a clamping cam having a handle 50. The position of the curved upper surface of said member 22 relatively to the shaft 4 which determines the body section to be reproduced can therefore be varied. If the center of the curved upper surface of said member 22 coincides directly with the axis line of said shaft 4, the vertical position or height of said shaft 4 will not be changed during the swinging of said lever 3 and an ordinary body section will therefore be produced. If, however, the right side of said member 22 be raised, then the entire swinging system with said shaft 4 will drop as the roll 24 rolls along the upper surface of said member 22, and a radiograph of a body layer will then be produced. This layer will be the thicker the more the right side of said member 22 was raised. Any suitable means may be provided for the vertical adjustment of said curved member in place of that described without departing from the spirit of the present invention, for example the gravity action which is operative in the embodiment above described may be replaced by spring action or the like.

Figures 5, 6:
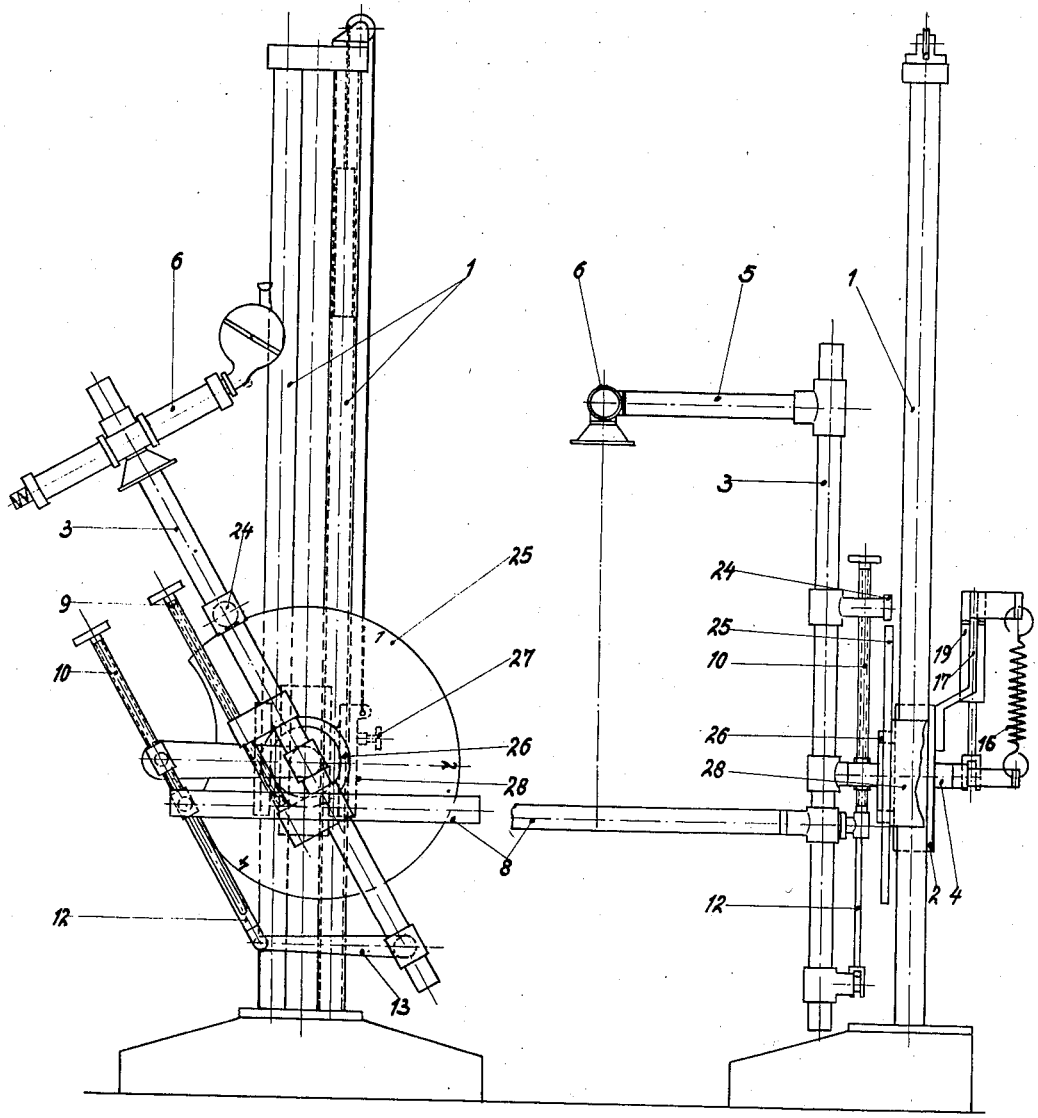
Fig. 5 is a front elevation of an illustrative embodiment of the invention in which the curved member 22 of Fig. 1 is replaced by an eccentrically mounted cam member of constantly increasing radius.
Fig. 6 is a side elevation of the embodiment shown in Fig. 5.

In Figs. 5 and 6 said curved member 22 is replaced by a cam member 25 of constantly increasing radius the edge of which is adapted to be engaged by said roll 24. Said cam member is rotatably mounted upon a sleeve 26 carried by a carriage 28 corresponding to carriage 2 of Figs. 1 and 2 weightlessly slidable upon the standards 1 and adapted to be clamped in adjusted position by clamping means 27. The swinging system may be lowered more or less during the exposure by suitable adjustment of said cam member 25.

The rapid and accurate adjustment of said shaft 4 for different body section planes is influenced more or less by the weight of the film or plate holder. The adjustment of the shaft 4 changes the distance between the film or plate holder and the body of the patient and as said holder should be as close as possible to the patient in order to obtain as sharp a picture as possible it is necessary that said film or plate holder be readjusted for each exposure so as to bring it in each case as close as possible to the patient or to the table supporting the patient when the latter is lying down. In accordance with the invention means are provided to eliminate frequent or continuous adjustments of the film or plate holder, that is to say of a part of the swinging system. This may be accomplished, for example, by securing said film or plate holder to the apparatus in such manner that when the adjustment of said shaft 4 is made relatively to the body or body section to be radiographed, the distance between said film or plate holder and said body or body section remains unchanged. In the illustrative embodiment of the invention shown, said means comprises flexible connections such as ropes by which said film or plate holder is firmly suspended to said standards 1 and is connected to said lever 3 for movement therewith in its swinging movement only by means of sliding collar.

This feature of the invention is illustrated in detail in Figs. 7, 8 and 9. The film or plate holder frame 8 is not firmly connected to said swinging lever 3 but is slidingly connected to said lever 3 and to links 12 by sliding collars 51 and 52, respectively. Said frame 8 is suspended by ropes 53 from cross piece 54 connecting the standards 1 at their tops. Said ropes are led through eyes 55 on the ends of a cross arm 11 on the same level as the shaft 4 upon which said cross arm is mounted. When said lever 3 effects its swinging movement the sections of said ropes below said eyes pivot in the latter and said frame 8 is raised the same as if said collars 51, 52 were fast upon said lever 3 and links 12, respectively. Said frame 8 is shown in its lowest position in Fig. 8 in dotted lines at 8a. If in order to radiograph a lower body section the shaft 4 be lowered, said ropes 53 will slide through the eyes 55 and the collars 51, 52 will slide upwardly along said lever 3 and said links 12, respectively. Said frame 8 therefore remains at the same level or height from the ground and its position relatively to the table supporting the patient and therefore to the patient remains unchanged.

It is therefore possible after once adjusting said frame 8 as close as possible to said table to leave its position unchanged, which greatly facilitates the work of the operator of the apparatus.

To permit such once for all adjustment of said frame 8 relatively to said table in the different heights of the latter, the upper end of ropes 53 are connected to a common crank 56, said crank being held in adjusted position by a locking pawl and ratchet 57, 59 (see Fig. 9). Said pawl 59 is pressed into engagement with said ratchet by a spring 58 and can be disengaged from said ratchet by a handle 60.

This arrangement is also of importance when the supporting table for the patient is to be used simply as a diaphragm table. Then the ropes 53 need be drawn up by said crank 56 only sufficiently to raise said frame 8 close up under said table. In order to enable oblique exposures to be made with the parts in this position, said curved member 22 is provided with apertures 46 into which a pin carried by the member 48 may be caused to snap by suitable manipulation of the handle 62.

The objectionable effect of the considerable excess weight of that side of the swinging system carrying the X-ray tube on the swinging movement, has already been discussed and the use of driving means, more particularly resilient driving means, as a remedy which made it possible to do without gravity as a driving or braking force for the swinging movement and to counterbalance said excess weight of the X-ray tube side of said swinging system, was recommended. In the case of the present invention however, it would be disadvantageous to effect this counterbalancing or equalization by an additional weight located upon the film or plate holder side of said swinging system, as thereby the weight of the entire apparatus would be materially increased. This would also necessitate the acceleration or putting in motion and braking of a greater mass and above all things would require that the additional weight on the film or plate holder side be moved whenever the X-ray tube was moved on said swinging system. In accordance with the present invention therefore, said excess weight of the X-ray tube side of said two-armed lever 3, and more particularly the weight of said X-ray tube and its protective housing and support are equalized or counterbalanced by a counterweight which acts upon said X-ray tube carrier through flexible connections such as a system of ropes for example.

Figure 10:
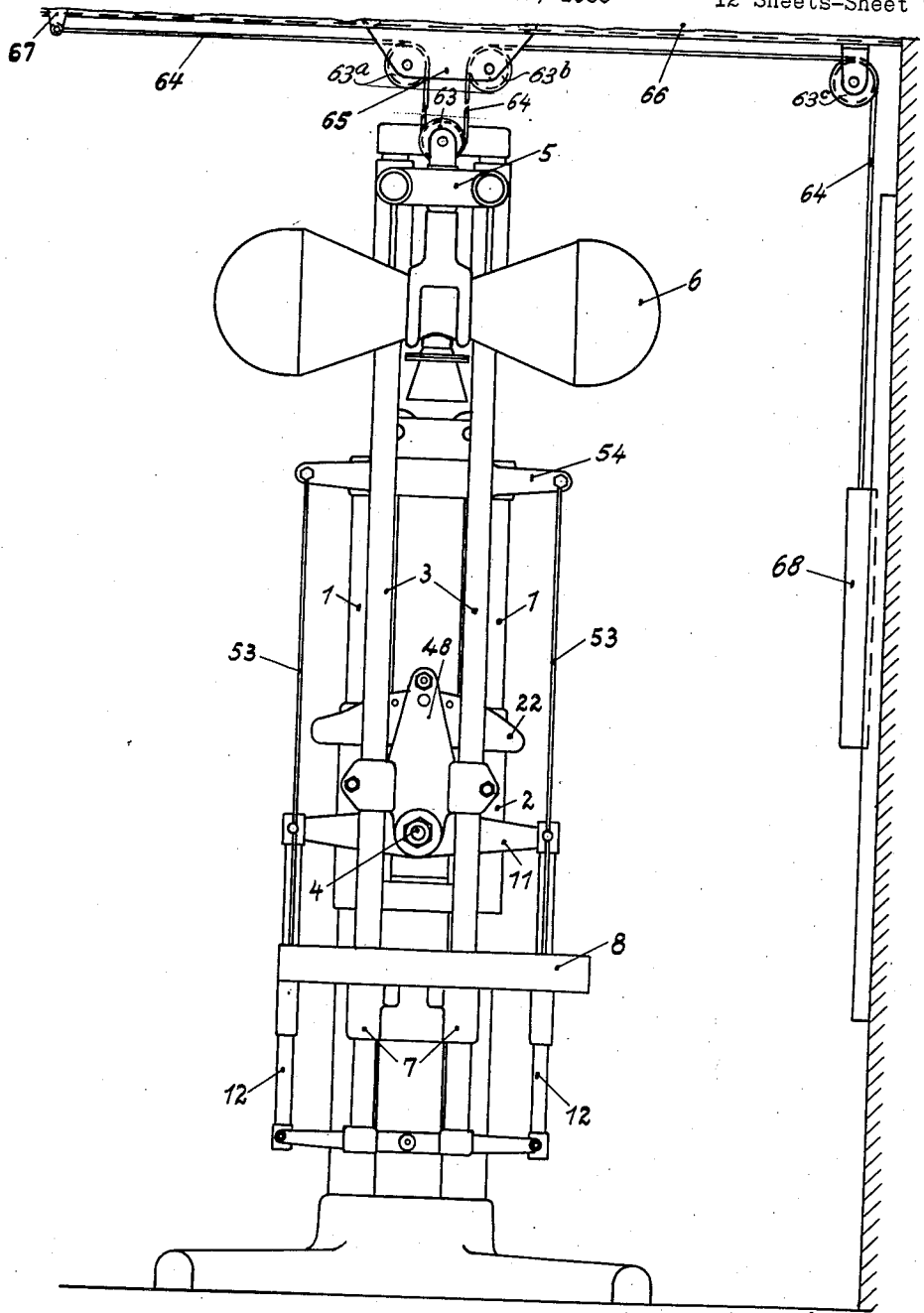
Fig. 10 shows in front elevation illustrative means for equalizing or counterbalancing the excess weight of that side of the lever 3 carrying the X-ray tube and other parts, said lever 3 being shown in its median position.

Referring to Figs. 10 and 11 in the first of which said swinging system is shown in its median position and in the second of which it is shown in one of its extreme end positions, a pulley 63 is provided on the X-ray tube carrier arm 5. A traveler 65 is adapted to travel along a horizontal rail 66 and a rope 64 having one end secured at 67 to said rail and the other provided with a weight 68 passes over said pulley 63, two pulleys 63a, 63b carried by said traveler and a fixed pulley 63c carried by said rail. The weight 68 will be sufficient to counterbalance said excess weight of the X-ray tube end of said lever 3. In the swinging movement of said lever 3, said traveler 65 travels along said rail in the same direction as the upper end of said lever, as shown in Fig. 11.

Figure 12:
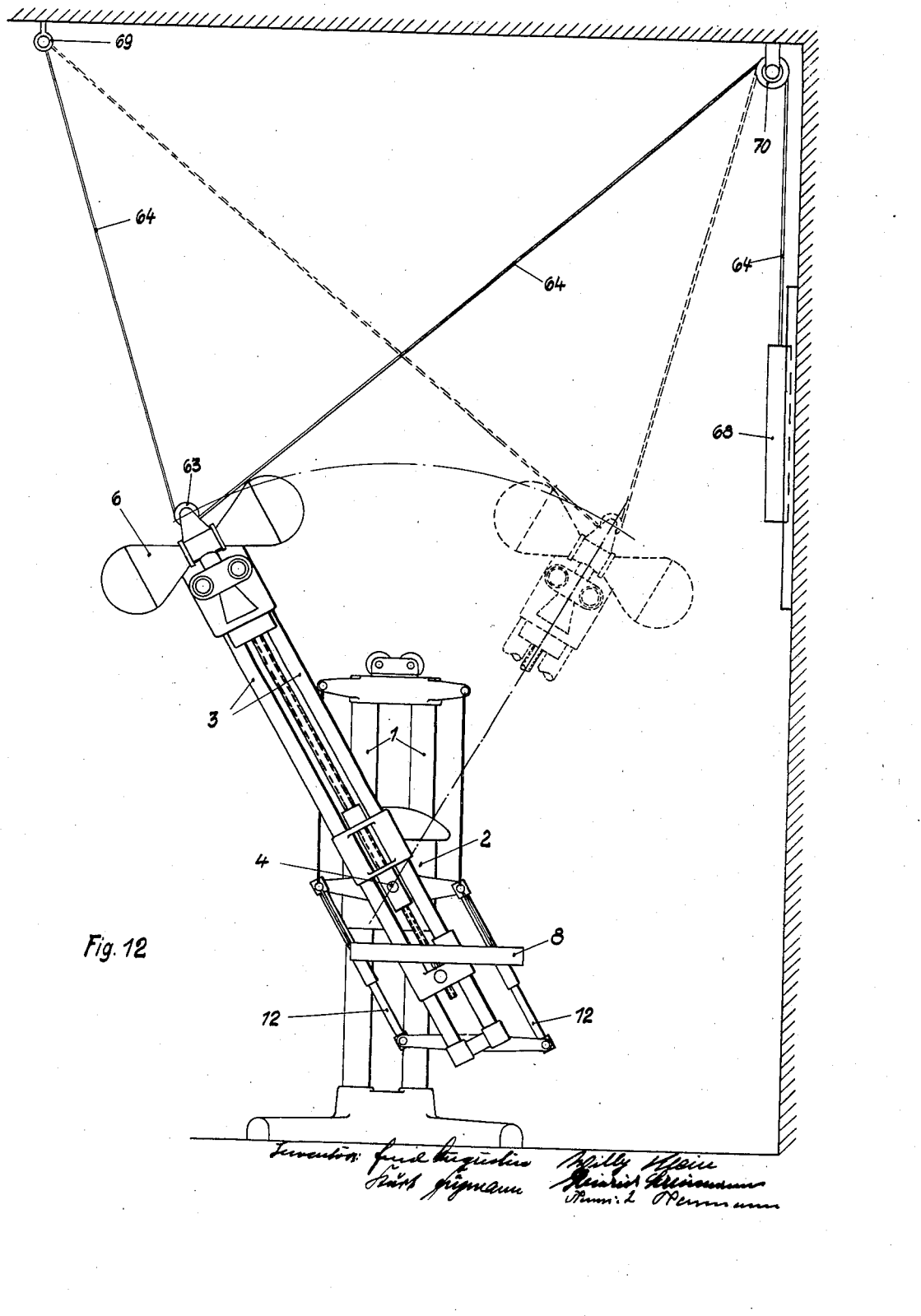
Fig. 12 shows in front elevation modified means for counterbalancing said excess weight.

A modification of the above described arrangement is shown in Fig. 12. In this modification the rope 64 has one end fixed to the ceiling at 69 to the left of the apparatus, whence said rope passes over the pulley 63 on the top of said lever 3 and thence over a fixed pulley 70 secured to the ceiling at the right of said apparatus and preferably adjacent the wall, the free end of said rope carrying a counterbalancing weight 68 of suitable weight for the purpose described. Said fixture 69 and pulley 70 will preferably be at the same distance from the median line of the apparatus. As distinguished from the traveler 65 in the construction of Fig. 10, this arrangement offers the special advantage that besides its counterbalancing action it acts as a drive for the swinging system during the first half of the swinging movement of the latter and effects a braking action thereon during the second half of said swinging movement. This structure is also simpler and cheaper.

As regards the fixed points 69 and 70 it should be noted that the higher these points are placed the less would be the influence of a change of position of the X-ray tube supporting arm on the lever 3. Furthermore the further these two fixed points are spaced from each other, that is to say the greater the angle formed by the two rope sections at the roll 63, the heavier must be the counterbalancing weight. This angle also must not be less than a certain minimum, as otherwise the braking action upon the swinging movement will be too great. As a result in practice it is best to place the points 69 and 70 as high as possible while so arranging their height above the apparatus relatively to their spacing from each other that the angle formed by the rope at the pulley 63 shall be just large enough to enable the lever 3 to swing from its starting position exactly to its end position under the influence of a light push.

The objectionable effect of one-sided weight forces upon the uniformity of the swinging movement of the swinging system and on the obliteration of interfering shadows is all the more apparent the greater the length of the path traversed by said swinging system while the X-ray tube is switched on. The invention aims to overcome this objection, for example, by making it possible to vary the length of said path by adjustment. This makes it possible to leave the X-ray tube switched on only during a practicable or expedient uniform movement of said swinging system. Various means may be used in accordance with the invention for this purpose, but where the switching on and off of the X-ray tube is effected by contacts controlled by said swinging system a very simple way is to make the contacts for switching said X-ray tube on and off adjustable lengthwise of the path traversed by said swinging system in its swinging movement.

The above-described arrangement also makes it possible to make radiographs of body layers by a novel method in which the raising and lowering of heavy masses is avoided. Experiments have shown that the making of radiographs of body layers of different thickness by relative displacement of the swinging system and the patient parallel to themselves may be effected quite simply by relatively adjusting the movable part of the apparatus and the patient in respect to the middle section of the body layer to be radiographed and by regulating the distance traversed by the movable part of the apparatus while the X-ray tube is switched on in such manner that the greater the thickness of the layer to be radiographed the shorter will be said distance.

The adjustable switching contact will preferably be mounted upon the curved member (for example 22 in Fig. 17) which carries the swinging system. Said curved member 22 is provided with two housings 71 and 72 (see Figs. 13 and 14) in the former of which is mounted a switching contact 73 and in the latter a switching contact 74. An insulating piece 75 extends through the top of the housing 71 and carries a pin 77 which engages one member of said contact switch 73 and a similar insulating piece 76 extends through the top of the housing 72 and is provided with a pin 78 which engages one of the members of the contact switch 74.

At the beginning of the swinging movement of the lever 3 the roll 24 carried by the latter rests upon the insulation piece 75 thus pushing down the pin 77 so that the contact switch 73 is open. The contact switch 74 on the other hand is closed. If the locking means for the swinging system be now released, said swinging system will swing toward the left in Fig. 13 and the roll 24 will roll off of said contact piece 75, thus permitting the contact switch 73 to close. The X-ray tube is now switched on and remains switched on until, in the further swinging movement of said swinging system to the left, the roll 24 rolls onto the insulating piece 76, as shown in Fig. 13, thus opening the contact switch 74 and braking the X-ray tube circuit, thus completing the exposure. The shorter the distance between the insulating pieces 75 and 76, the thicker will be the body layer radiographed. The housings 71 and 72 are each provided with an angle piece 79 which fits over the top edge of said curved member 22 and carries a screw-threaded stud extending through a suitably curved slot 80 provided in said curved member 22, the projecting end of said stud being provided with a winged nut 82. Said housings 71 and 72 may thus be relatively adjusted to vary the distance separating said insulating pieces 75 and 76 and then clamped in adjusted position.

The use of adjustable contacts and more particularly of contacts which are closed and opened by said swinging system entails the danger that if one contact should fail the X-ray tube may be subjected to too great a load. This danger may be met in accordance with the invention by the use of a holding relay which allows the high tension to be switched on again by said swinging system only after the main switch of the apparatus has been thrown out.

If a diaphragm against stray rays is used it is preferable that said diapragm be set in operation by the main switch of the X-ray apparatus and then at the end the swinging system be set in operation by said diaphragm.

Figure 16:
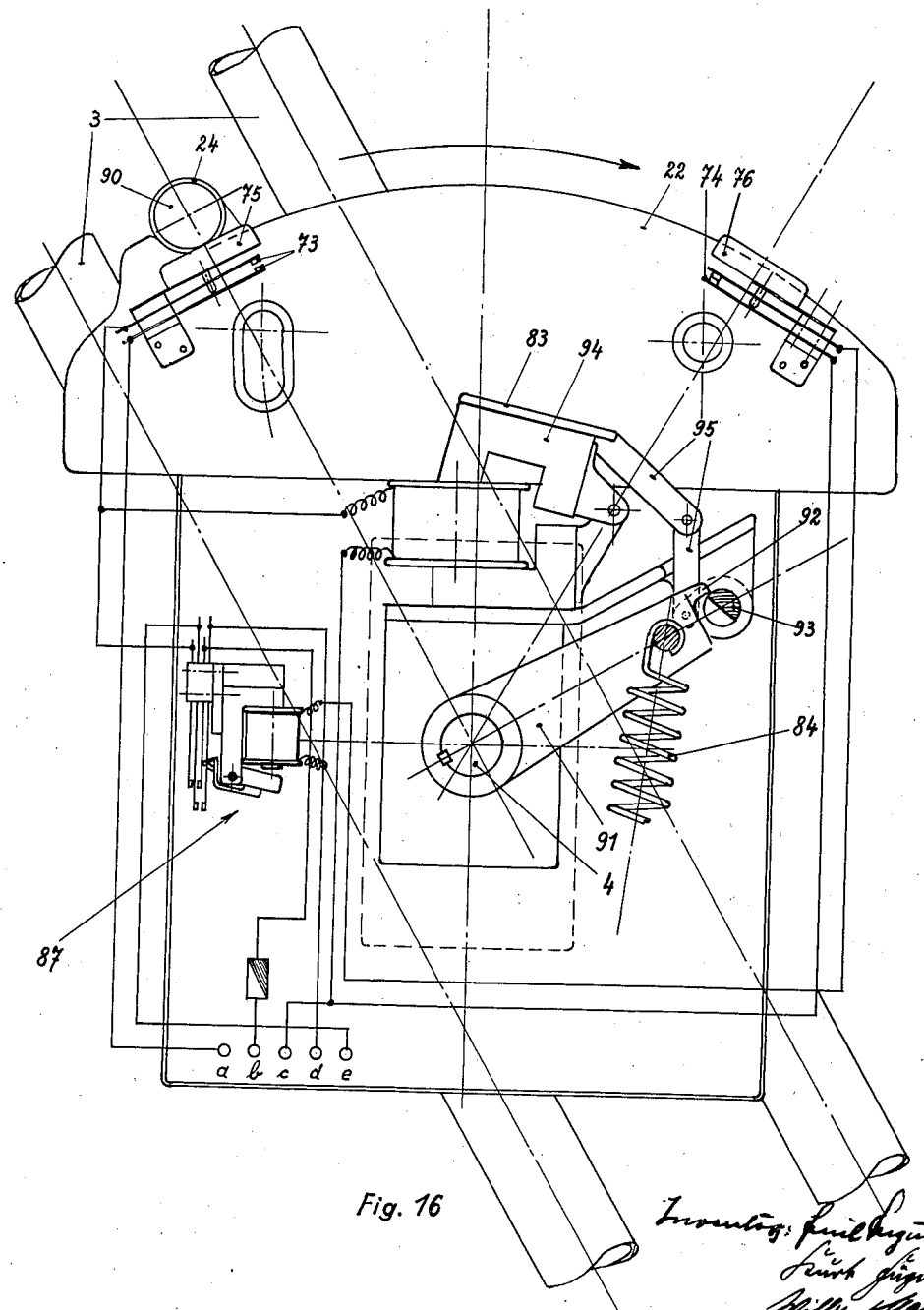
Fig. 16 shows the arrangement of Fig. 15 more in detail.

Referring to Figs. 15 and 16, the latter showing the arrangement more in detail, the swinging lever 3 is shown in Fig. 15 as held in its original or starting position by a relay 83 against the action of a spring 84. Two contacts 73, 74 provided with insulating pieces 75 and 76 are provided on said curved member 22 and serve to switch the high tension current on and off. The holding relay belonging to the apparatus is shown at 87 and the main switch and exposure switch belonging to the X-ray apparatus are shown at 88, 89 respectively.

The operation is as follows: The swinging lever 3 being in its starting position and the main switch 88 being in the "off" position, then the contact 73 being open, the circuit of the coil of the relay 87 will be closed through the closed contact 74 and the relay 87 will be thrown in. If now the main switch 88 be closed the circuit of the coil of the relay 87 will nevertheless remain closed through one contact of said relay. On the other hand the coil of the relay 83 receives current through the other contact and the spring 84 starts the swinging movement of the lever 3 along said curved member 22. As soon as the roll 24 leaves the insulating piece 75 the contact 73 and therefore the circuit of the coil of the exposure switch 89 will be closed and the high tension current is thrown on. As soon as, in the swinging movement of said lever 3, the roll 24 reaches the insulating piece 76, said contact 74 will be opened and the coil of the relay 87 will be de-energized. This causes the relay 87 to throw out the high tension current and to interrupt the current of the coil of said relay 83. The roll 24 now rests upon said insulating piece 76, the contact 74 is open while the contact 73 is closed. So long as the main switch 88 is in the "on" position the high tension cannot be again thrown in by swinging movement of the lever 3 as the relay 87 cannot be energized. Only when the main switch has been moved to the "off" position and the lever 3 has been moved back into the starting position for its next swinging movement will the coil of the relay 87 receive current, thus enabling a further exposure to be made.

Fig. 16 shows a practical construction and arrangement of the parts on the back wall of the apparatus, the lever 3 being shown in the starting position for its swinging movement. In place of a single roll 24 two such rolls are provided one of which, 24, rolls along the curved member 22 and operates the contacts 73 and 74. As soon as the roll 90 leaves the insulating pieces 75 and 76 the contacts are closed.

The connection of the swinging lever 3 with the relay 83 is as follows: Rigidly connected to the shaft 4 is an arm 91 which is provided with a dog 92 which engages a stop 93 when the relay 83 is de-energized. When the relay 83 is energized the armature 94 will be attracted, which acting through the lever system 95 will turn the stop 93 thus releasing the dog 92 and permitting the spring 84 to impart the swinging movement to the lever 3 through said lever 91 and shaft 4.

The various features of the invention described may be used separately or in combination. In Figs. 17 and 18 there is shown in front elevation and lateral elevation, respectively, apparatus containing a plurality of the features of the invention already described and others which enable the apparatus to be quickly and accurately adjusted and also the quick and rapid adjustment of the magnitudes which are controlling in making radiographs of the body sections or body layers. Fig. 17 shows the swinging system in its end position and Fig. 18 shows it in its median position.

A shoe 97 is slidably mounted in a carriage 2, which is counterbalanced and adapted to slide vertically on the standards 1. In said shoe 97 is mounted the shaft 4 which carries rigidly the two-armed lever 3. Said carriage 2, swinging system and a member 22 may be counterbalanced by means similar to that described in connection with Figs. 1 and 2. A shoe 98 is mounted for sliding movement in said lever at one side of said shaft 4, said shoe carrying the supporting arm 5 for the X-ray tube contained in its housing 6. A support 7 is slidingly mounted upon said lever 3 at the other side of said shaft 4, the film or plate holder frame 8 being pivoted to said support 7, said frame also serving to carry the diaphragm for stray rays. The plate or film is always maintained parallel to the plane of the body section during the swinging movement of said lever 3 by links 12 carrying sliding collars 52 secured to a cross piece or frame 8, the lower ends of said links 12 being pivotally connected to the lower end of said lever 3. Said frame 8 is suspended from the cross head 54 joining the tops of standards 1, by ropes 53 passing over pulleys 119 mounted on said cross head, so that its distance from the patient-supporting table will not change when said shaft 4 is moved vertically.

In order to permit making radiographs of body layers the shoe 97 in which the shaft 4 is rotatably mounted is vertically slidable in carriage 2 and said carriage carries a curved member 22. In the swinging movement of said lever 3 a roll 24 carried by a member 48 rigidly connected to the shaft 4 rolls along the upper curved edge of said member 22. Said member 48 also supports the lever 3 so that the entire swinging system is suspended from said roll 24. The driving means to impart swinging movement to said lever 3 is contained in a housing 30 and preferably comprises a spring, as already described.

To facilitate the vertical adjustment of the shaft 4 to suit the body section to be made of the patient lying upon the table 101, said shaft has extending axially therethrough a sliding rod 102 which can be drawn out as far as the patient. By then vertically adjusting the carriage 2 upon said standards 1 the said adjustment of the shaft 4 to the level of the desired section can be readily made. A scale 103 mounted on one of said standards and gauged according to the distance of said shaft 4 from said table facilitates said adjustment.

As explained, the film or plate holder frame 8 does not change its vertical position when said shaft 4 is adjusted vertically, but the distance between the film or plate and the body section to be radiographed changes. In order to obtain comparable radiographs the distance separating the section to be radiographed from the point of emission of the X-rays should vary at a uniform ratio. Means are accordingly provided in accordance with the invention to secure this result, said means herein conveniently comprising two pulleys 104a and 104b, the former carried by the cross head 104 and the other by the cross head 105 rigidly connecting the two rods forming the lever 3. An endless rope 107 passes over said pulley and is connected with said shoe 98. A gear 108 rigidly connected to the pulley 104b meshes with a worm provided upon a shaft 109 mounted in said cross head 105 and provided with a hand-operated crank wheel as shown. By turning said crank wheel the adjustment can be made according to the scale 110 carried by said lever 3. Said scale will preferably be gauged so that it is only necessary to adjust to the same number as on the scale 103 in order to ensure the same space ratio being preserved. It will be apparent that other means could be used in place of said rope system, such as a screw-threaded spindle for example or the like.

The X-ray tube carrying arm 5 is provided with a scale 111 which enables adjustment of the tube carrying carriage 112 which is slidable upon said arm 5 to be adjusted to the right and left of a zero point for making stereoscopic exposures.

The upper edge of said curved member 22 is preferably curved in the arc of a circle. Said member is pivotally mounted at one side and at the other is provided with a suitably curved slot 49 through which passes a clamping cam controlled by a hand lever 50. By releasing said handle 50 said member 22 may be swung upwardly to adjust the same to correspond to the desired thickness of body layer, a scale 115 being provided to facilitate such adjustment.

To determine the starting position for the swinging movement of said lever 3 a stop 14 is provided upon said curved member 22, against which said roll 24 abuts when said lever 3 is swung into the starting position. When said lever reaches the end of its operating swing movement it abuts against a leaf spring 117 the tension of which increases with the pressure exerted thereon, said spring being carried by said curved member 22.

If a spring drive be used to effect the swinging movement of said lever 3, the time consumed in the swinging movement will naturally vary with the adjustment of the shaft 4 and of the X-ray support. In order to effect a follow-up adjustment of said spring drive so that the time consumed by the swinging movement shall be always the same a hand wheel 118 is provided. This wheel will preferably be provided with a scale which will be so gauged relatively to the scales 103, 110 that by adjusting said wheel to the same number of its scale corresponding to the same number on said scales 103 and 110 one may be sure that all exposures will be made with the same time of swinging movement. It is therefore only necessary to adjust to the same number on said three scales in order to secure the same size ratio and the same time of swinging movement for every exposure or section. As already stated the film or plate holder frame 8 is suspended by ropes 53 to the cross head 54. In order to position said frame as close as possible to the table supporting the patient in making simple diaphragm exposures, said ropes 53, guided over the pulleys 119 have their ends secured to a shaft 120 mounted in said cross head 54 and which may be turned to wind up said ropes by means of said hand wheel 122 and worm and gear 121 already described.

We are aware that the invention may be embodied in other specific forms without departing from the spirit or essential attributes thereof, and we therefore desire the present embodiments to be considered in all respects as illustrative and not restrictive, reference being had to the appended claims rather than to the foregoing description to indicate the scope of the invention.

We claim:

1. Apparatus of the class described comprising, in combination, a swinging system including an X-ray tube and an X-ray sensitive layer holder, positively connected and adapted to swing as a unit in opposite directions in a plane at right angles to the body section to be radiographed and about an axis located in the plane of said body section, and means to maintain said X-ray sensitive layer always parallel to the plane of the body section to be radiographed, during the swinging movement of said system about said axis, the construction and arrangement being such that an X-ray passing through any point of the body section to be radiographed will always strike the same point of said sensitive layer during said swinging movement; and means to act upon said swinging system during said swinging movement to render said movement uniform.

2. Apparatus of the class described comprising, in combination, a swinging system including an X-ray tube, an X-ray sensitive layer holder and a two-armed lever upon opposite arms of which said X-ray tube and X-ray sensitive layer holder are respectively mounted, said system being adapted to swing as a unit about the axis of a shaft carrying said lever and in a plane at right angles to the body section to be radiographed, said axis being located in the plane of the body section to be radiographed, and means to maintain said X-ray sensitive layer always parallel to the body section to be radiographed during the swinging movement of said system about said axis, the construction and arrangement being such that an X-ray passing through any point of said body section to be radiographed will always strike the same point of said X-ray sensitive layer during said swinging movement; and means to act upon said system during said swinging movement to render said movement uniform.

3. Apparatus of the class described comprising, in combination, a swinging system including an X-ray tube and an X-ray sensitive layer holder positively connected and adapted to swing as a unit in opposite direcitons in a plane at right angles to the body section to be radiographed and about an axis located in the plane of said body section to be radiographed, and means to maintain said X-ray sensitive layer always parallel to the plane of the body section to be radiographed during the swinging movement of said system about said axis, the construction and arrangement being such that an X-ray passing through any point of the body section to be radiographed will always strike the same point of said sensitive layer during said swinging movement; means to act upon said system during said swinging movement to render said swinging movement uniform; and adjustable braking means adjustable to vary the duration of said swinging movement of said system.

4. Apparatus of the class described comprising, in combination, a swinging system including an X-ray tube and an X-ray sensitive layer holder positively connected and adapted to swing as a unit in opposite directions in a plane at right angles to the body section to be radiographed and about an axis located in the plane of said body section, the construction and arrangement being such that an X-ray passing through any point of the body section to be radiographed will always strike the same point of said sensitive layer during said swinging movement; and driving means to impart swinging movement to said swinging system; said driving means comprising a spring to impart said swinging movement to said system and a second spring to act upon said system to overcome any frictional resistance of the parts to said swinging movement.

5. Apparatus of the class described comprising, in combination, a swinging system including an X-ray tube and an X-ray sensitive layer holder positively connected and adapted to swing as a unit in opposite directions in a plane at right angles to the body section to be radiographed and about an axis located in the plane of said body section, the construction and arrangement being such that an X-ray passing through any point of the body section to be radiographed will always strike the same point of said sensitive layer during said swinging movement; and driving means to operate upon said swinging system throughout said swinging movement to neutralize friction of parts.

6. Apparatus of the class described comprising, in combination, a swinging system including an X-ray tube and an X-ray sensitive layer holder positively connected and adapted to swing as a unit in opposite directions in a plane at right angles to the body section to be radiographed and about an axis located in the plane of said body section, and means to maintain said X-ray sensitive layer always parallel to the plane of said body section to be radiographed during the swinging movement of said system about said axis, the construction and arrangement being such that an X-ray passing through any point of the body section to be radiographed will always strike the same point of said sensitive layer during said swinging movement; driving means including a spring to impart swinging movement to said swinging system; and means to vary the duration of the effective action of said driving means.

7. Apparatus of the class described comprising, in combination, a swinging system including an X-ray tube and an X-ray sensitive layer holder positively connected and adapted to swing as a unit in opposite directions in a plane at right angles to the body section to be radiographed and about an axis located in the plane of said body section, and means to maintain said X-ray sensitive layer always parallel to the plane of said body section during said swinging movement, the construction and arrangement being such that an X-ray passing through any point of the body section to be radiographed will always strike the same point of said sensitive layer throughout said swinging movement; and means, including a curved member vertically adjustable upon the frame of the apparatus, and a coöperating roll carried by said swinging system to travel along the curved edge of said member during said swinging movement to move said axis relatively to the body layer to be radiographed, a distance equal to the thickness of said body layer during said swinging movement.

8. In apparatus of the class described, more particularly for making radiographs in parallel planes of a body layer comprising, in combination, a swinging system including an X-ray tube and an X-ray sensitive layer holder positively connected and adapted to swing as a unit in opposite directions in a plane at right angles to the body section to be radiographed about an axis located in the plane of said body section, and means to maintain said X-ray sensitive layer always parallel to the plane of said body section during said swinging movement, the construction and arrangement being such that an X-ray passing through any point of the body section to be radiographed will always strike the same point of said sensitive layer during the said swinging movement; and means including a member provided with a curved edge and vertically adjustable upon the frame of the apparatus, and a coöperating roll carried by said swinging system to travel along said curved edge during said swinging movement, to move said axis relatively to said body layer a distance equal to the thickness of the latter during said swinging movement; and means to counterbalance the weight of said member during said swinging movement.

9. Apparatus of the class described comprising, in combination, a swinging system including an X-ray tube and an X-ray sensitive layer holder positively connected and adapted to swing as a unit in opposite directions in a plane at right angles to the body section to be radiographed and about an axis located in the plane of said body section, said X-ray tube and sensitive layer holder being upon opposite sides respectively of said axis and means to maintain said X-ray sensitive layer always parallel to the plane of said body section throughout said swinging movement, the construction and arrangement being such that an X-ray passing through any point of the body section to be radiographed will always strike the same point of said sensitive layer throughout said swinging movement; and counterbalancing means to act upon said swinging system during said swinging movement to counterbalance the excess weight upon the side of said system which carries said X-ray tube, and more particularly the excess weight of said X-ray tube, its protective housing and carrier.

10. Apparatus of the class described comprising, in combination, a swinging system including an X-ray tube and an X-ray sensitive layer holder positively connected and adapted to swing as a unit in opposite directions in a plane at right angles to the body section to be radiographed and about an axis located in the plane of said body section, and means to maintain said X-ray sensitive layer always parallel to said body section throughout said swinging movement; means in the path of said swinging movement and operated by movement of said swinging system to switch the hight tension current on and off; and a holding relay to prevent said swinging system, after it has once traversed its path, from again switching on said high tension current until after the main switch of the apparatus has been thrown open.

11. Apparatus of the class described comprising, in combination, a swinging system including an X-ray tube and an X-ray sensitive layer holder positively connected and adapted to swing as a unit in opposite directions in a plane at right angles to the body section to be radiographed and about an axis located in the plane of said body section; means to maintain said X-ray sensitive layer always parallel to said body section throughout said swinging movement; and means carried by said swinging system for adjusting said X-ray tube transversely of the axis about which said swinging system swings.

12. Apparatus of the class described comprising, in combination, a swinging system including an X-ray tube and an X-ray sensitive layer holder positively connected and adapted to swing as a unit in opposite directions in a plane at right angles to the body section to be radiographed and about an axis located in the plane of said body section; means to maintain said X-ray sensitive layer always parallel to said body section throughout said swinging movement; and means carried by said swinging system for adjusting said X-ray tube transversely of the axis about which said swinging system swings, said means incuding an endless flexible connection actuated through a self locking worm drive.

13. Apparatus of the class described comprising, in combination, a swinging system including an X-ray tube and an X-ray sensitive layer holder positively connected and adapted to swing as a unit in opposite directions in a plane at right angles to the body section to be radiographed and about an axis located in the plane of said body section; means to maintain said X-ray sensitive layer always parallel to said body section throughout said swinging movement; means relatively to adjust said axis and the body to be radiographed; and index means in the plane of said axis and adjustable toward and from the body to be radiographed, to facilitate said relative adjustment of said axis and said body in respect to the body section to be radiographed.

14. Apparatus of the class described comprising, in combination, a swinging system including an X-ray tube and an X-ray sensitive layer holdler positively connected and adapted to swing as a unit in opposite directions in a plane at right angles to the body section to be radiographed and about an axis located in the plane of said body section; means to maintain said X-ray sensitive layer always parallel to said body section throughout said swinging movement; means to lock said swinging system in starting position; and means to release said locking means.

15. Apparatus of the class described comprising, in combination, an X-ray tube; an X-ray sensitive layer holder; means to move said X-ray tube and said film holder to cause the X-ray tube focus and said film holder to travel as a unit in opposite directions relatively to the body to be radiographed and in a plane at right angles to the latter in making the exposure, said X-ray tube being mounted to direct the central ray therefrom always substantially upon the same point of the body section to be radiographed during the exposure; and means to maintain the X-ray sensitive layer in said holder always parallel to itself throughout said exposure, whereby each ray passing through any point of said body section to be radiographed will always fall upon the same point of said X-ray sensitive layer throughout the exposure; and means to render the movement imparted to said X-ray tube and film holder uniform, said last-named means comprising a pulley connected to said X-ray tube, a second pulley suspended from a fixed point above said apparatus, and a flexible connection secured at one end to a fixed point above said apparatus and passing over said pulleys, and a weight connected to the free end of said flexible connection, said two pulleys and fixed point being in the plane of movement of said X-ray tube and film holder, and said fixed point and said pulley suspended above the apparatus being adjacent the opposite ends of the path traversed by said X-ray tube and film holder in their said movement.

16. Apparatus of the class described comprising, in combination, a movable system including an X-ray tube and an X-ray sensitive layer holder; means to move said system to cause said X-ray tube and said film holder to travel in opposite directions as a unit relatively to the body to be radiographed and in a plane at right angles to the latter in making the exposure, said X-ray tube being mounted to direct the central ray therefrom always substantially upon the same point of the body section to be radiographed during the exposure; and means to maintain the X-ray sensitive layer in said holder parallel to itself throughout the exposure, whereby each ray from said X-ray tube passing through any point of said body section to be radiographed will always fall upon the same point of said X-ray sensitive layer; and means to render said movement of said X-ray tube and sensitive layer holder uniform, said last-named means comprising a pulley carried by said system; a rail fixedly mounted exterior to and above said system; a traveler to travel along said rail; two pulleys carried by said traveler; a fixed pulley suspended from a fixed point above said system; and a flexible connection having one end secured adjacent one end of said rail and passing over said pulleys; a weight carried by the free end of said flexible connection, said pulleys and fixed point to which one end of said flexible connection is secured, being all in the plane of movement of said system, and said fixed pulley and said point to which one end of said flexible connection is secured being situated adjacent the opposite ends respectively of the path of movement of said X-ray tube and sensitive layer holder.

17. Apparatus of the class described comprising, in combination, a system including a positively connected X-ray tube and X-ray sensitive layer holder; a shaft about which said system is adapted to swing to cause said X-ray tube and said holder to move as a unit in opposite directions upon opposite sides respectively of the body to be radiographed and in a plane at right angles to said body in making an exposure; and means to maintain the X-ray sensitive layer in said holder always parallel to said body during the exposure; the construction and arrangement being such that an X-ray passing through any point of said body will always fall upon the same point of said X-ray sensitive layer throughout the exposure; driving means to impart swinging movement to said system; and means to act upon said system to render said swinging movement uniform.

18. Apparatus of the class described comprising, in combination, a system including a positively connected X-ray tube and X-ray sensitive layer holder; a shaft about which said system is adapted to swing to cause said X-ray tube and said holder to move as a unit in opposite directions upon opposite sides respectively of the body to be radiographed and in a plane at right angles to said body in making an exposure; and means to maintain the X-ray sensitive layer in said holder always parallel to said body during the exposure; the construction and arrangement being such that an X-ray passing through any point of said body will always fall upon the same point of said X-ray sensitive layer throughout the exposure; resilient driving means to impart swinging movement to said system; and means to act upon said system to render said swinging movement uniform.

19. Apparatus for making radiographs of body layers comprising, in combination, a system including a positively connected X-ray tube and X-ray sensitive layer holder; a shaft about which said system is adapted to swing to cause said X-ray tube and said holder to move as a unit in opposite directions upon opposite sides respectively of the body layer to be radiographed and in a plane at right angles to said body layer in making an exposure; and means to maintain the X-ray sensitive layer in said holder always parallel to said body layer during said swinging movement; the construction and arrangement being such that an X-ray passing through any point of said body layer will always fall upon the same point of said X-ray sensitive layer throughout the exposure; means for relatively adjusting said shaft and said body layer in a direction transversely to said body layer; means relatively to move said shaft and said body layer in a direction transversely to said body layer during and in unison with said swinging movement of said system; and means controlled by said swinging movement to start and stop the exposure.

20. Apparatus for making radiographs of body layers comprising, in combination, a system including a positively connected X-ray tube and X-ray sensitive layer holder; a shaft about which said system is adapted to swing to cause said X-ray tube and said holder to move as a unit in opposite directions upon opposite sides respectively of the body layer to be radiographed and in a plane at right angles to said body layer in making an exposure; and means to maintain the X-ray sensitive layer in said holder always parallel to said body layer during the exposure; the construction and arrangement being such that an X-ray passing through any point of said body layer will always fall from the same point of said X-ray sensitive layer throughout the exposure; means for relatively adjusting said shaft and said body layer in a direction transversely to said body layer; means relatively to move said shaft and said body layer in a direction transversely to said body layer during and in unison with said swinging movement of said system; and means controlled by said swinging movement to start and stop the exposure, said last-named means being adjustable to vary the duration of the exposure.

EMIL AUGUSTIN.
KURT FÜGMANN.
WILLY KLEIN.
HEINRICH SCHLIEMANN.
HEINRICH HERRMANN,